Nov. 24, 1953     C. A. FRESE     2,660,125
CONTROL FOR SPRAY EQUIPMENT
Filed Nov. 6, 1950
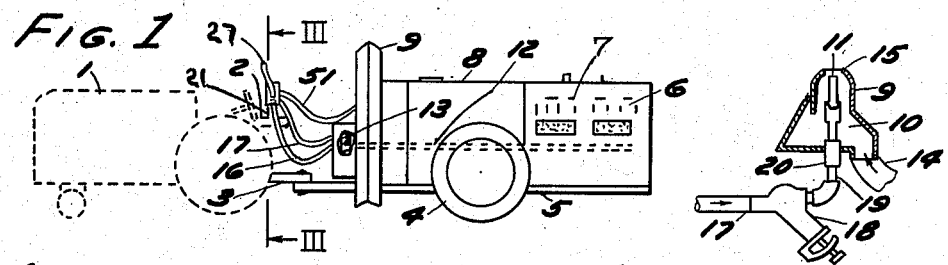
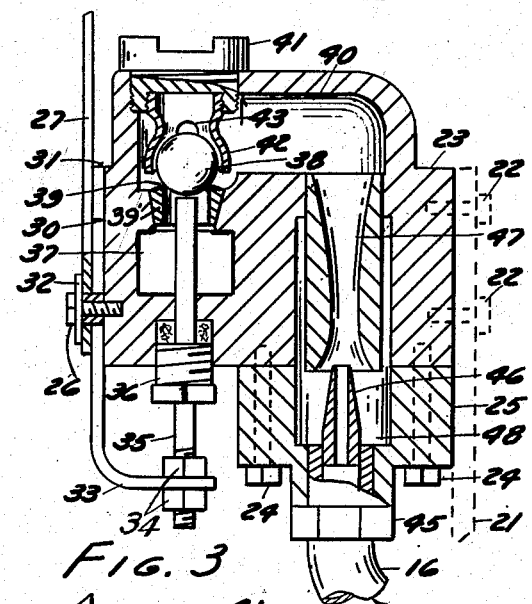
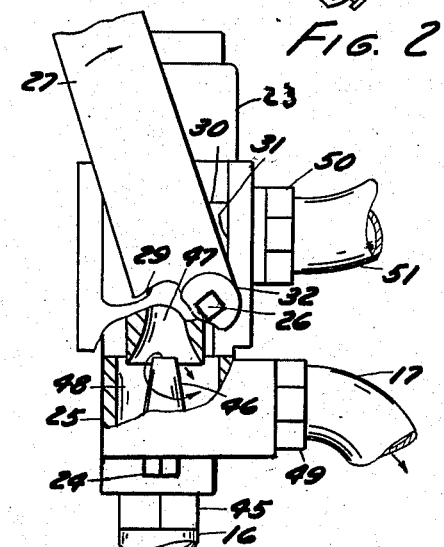
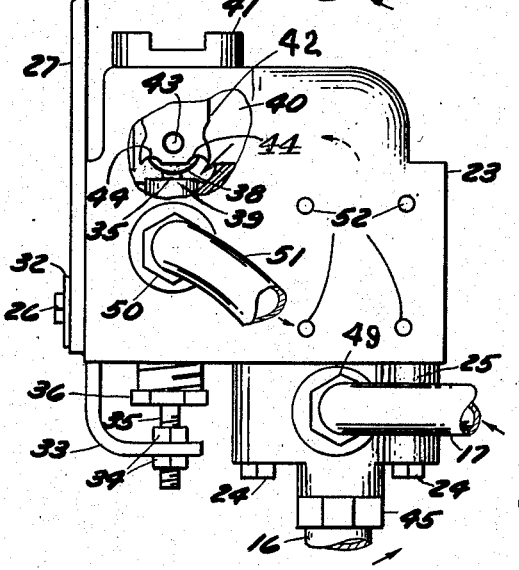
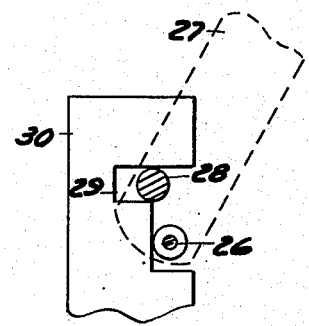
Inventor
CLARENCE A. FRESE Patented Nov. 24, 1953

2,660,125

UNITED STATES PATENT OFFICE 2,660,125

CONTROL FOR SPRAY EQUIPMENT

Clarence A. Frese, Hudson, Mich., assignor to The Hardie Manufacturing Company, Hudson, Mich., a corporation of Michigan Application November 6, 1950, Serial No. 194,268

2 Claims. (Cl. 103—262)

This invention relates to liquid control in supply lines, especially as having flow control remote from the delivery or discharge and from such remote location in the line determining to and fro flow as to the discharge.

This invention has utility in connection with the handling of solutions or liquids, more particularly as carrying suspension particles, such as pigments, but peculiarly having to do with spray nozzles as for insecticide and stock as well as vegetation treatment substances, wherein upon cutting off of nozzle discharge, there is a drawback to withdraw the solution from the region of the nozzle and clear adjacent portions of the line or duct from allowing the solution to congeal or accumulate sedimentation to an extent to disturb practical succeeding operation of the nozzle or nozzles at varying lapse intervals thereafter.

Referring to the drawings:

Fig. 1 is a side elevation of a trailer tank pump unit, having showing in dotted lines of tractor for hauling thereof, at proximity to which tractor seat there is the control of this invention; the figure being somewhat diagrammatic;

Fig. 2 is a fragmentary showing of a region of the nozzle for the insecticide projector boom for orchard use in the trailer unit of Fig. 1;

Fig. 3 is an enlarged vertical section in the region of the line III—III, Fig. 1, showing the control in spray delivery position for insecticide dispersion thru a bank of nozzles;

Fig. 4 is a view from the left of Fig. 3, with a portion broken away to show the solution flow course toward the nozzles;

Fig. 5 is a view in elevation of the control, from the right in Fig. 1, on the scale of Fig. 3, with a portion broken away to show the flow at nozzle clearing cut-off for the control; and Fig. 6 is a fragmentary view from the left of Fig. 5, showing the actuator features for the cut-off.

A tractor 1 is shown with a seat 2, and a trailer hitch connection 3. Ground wheels 4 rollably mount a chassis 5 coupled to the tractor 1, by the hitch 3. The chassis 5 carries a housing for a motor or gas engine such as power means 6 to drive a pump or pressure supply means 7. A tank 8 provides storage for the solution to be sprayed. Forwardly of the tank 8 and carried by the trailer chassis 5 is a diagonally pitched or inclined boom 9 forming a shield for a bank of nozzles of the spray device. The boom 9 provides a housing chamber 10 (Fig. 2) along in which is a manifold for a series of adjustable nozzles 11. A shaft 12 from the power means 6 extends to a fan or air impelling means 13 for supplying thru duct 14 air volume. This supply air may be in pressure as much as two or three ounces to be discharged from the chamber 10 at the region of openings 15. This air volume is sufficient to form an envelope about the nozzle discharge for promotion of the range and atomizing effectiveness of the nozzles.

The pressure supply means 7 draws agitated solution from the tank 8 and delivers such as a supply into a duct 16, which may be in the range of 1000# per sq. inch in pressure. A duct 17 in its course toward the nozzles has a take-out for sedimentation at a strainer 18 (Fig. 2) from which extends a duct 19 to a manifold 20 as a supply for the nozzles 11.

A bracket 21 in proximity to the seat 2 (Figs. 1, 3) has bolts 22 to mount a housing 23. Bolts 24 mount a minor housing or lower section 25 on the main or upper housing section 23. A pivot bolt 26 at the opposite side of the housing from the bracket 21, rockably mounts a lever or actuator arm 27 having a throw pin 28 (Fig. 6) to engage cam way 29 for shifting a plate 30 in a slide way 31 of the housing 23. A washer 32 on the bolt 26 locks the plate 30 to be held for sliding in the way 31. The plate 30 has an offset end 33 at which nuts 34 adjust assembly therewith of a plunger 35 extending thru a gland 36 into a chamber 37 in the housing 23.

At the nozzle operating position of the controller, the arm 27 is so positioned that thru its offset 33, the plunger 35 is in down or retracted position. This means that a check valve or ball 38 is on a seat 39 on the end of a sleeve element or throat 39' thereby shutting off flow from a chamber 40 in the housing 23 to the chamber 37 in said housing. A closure plug 41 aligned with the plunger 35 and the seat 39 for the ball valve 38 adjustably mounts a cage 42 having flow openings 43 and notches 44 (Fig. 5) for ready flow to operate the check valve for gravity seating toward the plunger 35. This means that as the plunger 35 is retracted, the ball 38 is on the seat 39 and this control check valve is closed. However, as the plunger 35 is lifted, the ball 38 is shifted away from the seat 39 into the cage 42, and there is flow communication from the chamber 40 to the chamber 37.

The housing 25 has a fitting connection 45 (Fig. 3) for the high pressure carrying supply duct 16 from the means 7. A jet tip 46 in the housing 25 is directed into the throat of a Venturi section 47 in the housing 23 in communication with the chamber 40. The controller comprises the major housing 23, a minor housing section 25. The section 25 provides port connection for the first duct 17 spaced by the jet 46 from the second duct entrance port. The venturi 47 is in a first leg of an inverted U-shaped way which is connected by a crossover 40 to the second leg of the U-shaped way having the chamber 37 and the third duct 51 therefrom. However, with the ball valve 38 closed, the jet 46 has its discharge into a chamber 48 in the section 25 for outflow by a fitting 49 to the duct 17 thus directing the high pressure solution to flow past the strainer 18 to the nozzles 11 and in discharge therefrom in the envelope of air from the chamber 10 at the boom 9, forms a mist in its directed discharge into orchard trees.

As the end of a row is reached, or there be other occasion for stoppage interval, the tractor driver who determines the speed of travel, its direction and other adjustments, may throw the arm or handle 27 (Figs. 5, 6), to unseat the ball 38 from its closed position on the seat 39. The pressure inflow from the duct or line 16 continues, but the Venturi nozzle or section 47 is now effective as an injector for bringing back from the line 17 residue therein.

The line 17 is cleared of possible sedimentation therein of spraying solution at the nozzle or in proximity thereto due to the action of the venturi 47 into the chamber 40. With the valve ball 38 now unseated, this induced flow due to the venturi is from the chamber 40 into the chamber 37 with a fitting 50 providing outlet therefrom by a duct or line 51 extending to the supply tank 8. This deposit is in the tank 8 for agitation to keep the solids in suspension. Flow actuation means 7 promotes circulation of the suspension-carrying liquid to the nozzles, as spraying operation may be continued or again undertaken.

Importance resides here, not only in the upkeep of the equipment in having the nozzles and passages thereto emptied against drying in or sedimentation deposit therealong, but this special upkeep care is incidental to according attention to the normal operation of the equipment. Furthermore, this solution volume is not left to drain out as waste from the nozzles and ducts thereto, but is a material economy factor in that all solution not as nozzle directed toward the foliage or trees to be treated, is in total volume forthwith reclaimed by flow back thru the duct 51 to the supply tank 8. Under this practice the tractor driver may turn on the equipment for the nozzles to be effective in spraying at the entrance end of a row of trees. For a gap in the row, as well as at row end, misuse of the solution is avoided, by the simple operation of the conveniently accessible hand lever or arm 27. At the turn-on, whether in the lapse of seconds or minutes, there is efficient resupply in spraying by the precleansed ducts and nozzles to begin at the very region to be thus serviced. The lapse interval has not besmeared the intervening ground area, for there has not been dripping from the nozzles.

There is importance in locating the control conveniently for the one controlling the transit. Bolt openings 52 (Fig. 5) provide for variation on mounting the housing for the control.

What is claimed and it is desired to secure by Letters Patent is:

1. In spray solution equipment wherein said solution carries solid particles suspended therein causing rapid wear of a valve, a housing providing a chamber, first and second ducts communicating with said chamber, a jet and venturi aligned with the second duct for supplying said solution to said chamber, a third duct leading from said chamber for conducting said solution from said chamber, a sleeve element in said chamber at the third duct providing an annular seat, a valve ball in said chamber between said sleeve element and said first and second ducts, a cage in said chamber for said valve ball permitting rotation of said valve ball and movement of said valve ball toward and away from said seat in said sleeve element whereby said valve ball may engage said seat at different rings of contact on said ball each time said ball seats, a plunger movable into said sleeve element from said third duct side of said chamber for moving and positioning said valve ball away from said seat for flow from the second duct to act thru the venturi for promoting flow from the first duct to pass the venturi and thru the sleeve element to the third duct, and manual lever means for operating said plunger.

2. A fluid flow controller comprising a housing having an inverted U-shaped way therein, the first leg of the U-shaped way having an upwardly directed venturi therein, a fitting connected to the housing and having a first port ,there being a pressure duct second port in the fitting having a jet directed into the venturi, said jet spacing the first port from the second port, said U-shaped way having a crossover portion, the second leg of the U-shaped way having a ball valve seat adjacent the crossover portion of the U-shaped way, a ball valve shiftable toward the second leg to close the seat, said housing having a discharge third port from the second leg in flow communication with the venturi upon unseating of the ball, and a manually controllable plunger in the second leg to thrust the ball away from its seat for pressure discharge from the jet to induce flow from the first port into the venturi and flow in the U-shaped way to the third port.

CLARENCE A. FRESE.

References Cited in the file of this patent

UNITED STATES PATENTS

| Number | Name | Date |
|---|---|---|
| 1,393,555 | Lockyer | Oct. 11, 1921 |
| 1,638,758 | Boyett | Aug. 9, 1927 |
| 1,980,427 | Parker | Nov. 13, 1934 |
| 1,987,649 | Wertz | Jan. 15, 1935 |
| 2,476,960 | Daugherty | July 26, 1949 |
| 2,480,346 | Watts | Aug. 30, 1949 |
| 2,525,256 | Byram | Oct. 10, 1950 |
| 2,537,266 | Granberg | Jan. 9, 1951 |